US009463768B2

(12) United States Patent
Tanabe et al.

(10) Patent No.: US 9,463,768 B2
(45) Date of Patent: Oct. 11, 2016

(54) SIDE AIRBAG APPARATUS

(71) Applicants: TS TECH CO., LTD., Asaka-shi, Saitama (JP); HONDA MOTOR CO., LTD., Tokyo (JP)

(72) Inventors: Jinichi Tanabe, Tochigi (JP); Kazuhiro Hayashi, Tochigi (JP); Yoshihiko Morita, Saitama (JP); Shuhei Fujiwara, Saitama (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/798,590

(22) Filed: Jul. 14, 2015

(65) Prior Publication Data

US 2016/0009248 A1    Jan. 14, 2016

(30) Foreign Application Priority Data

Jul. 14, 2014    (JP) .................................. 2014-144402

(51) Int. Cl.
*B60R 21/276*    (2006.01)
*B60R 21/207*    (2006.01)
*B60R 21/215*    (2011.01)

(52) U.S. Cl.
CPC ........... *B60R 21/276* (2013.01); *B60R 21/207* (2013.01); *B60R 21/215* (2013.01); *B60R 2021/2078* (2013.01)

(58) Field of Classification Search
CPC .............. B60R 21/207; B60R 21/215; B60R 2021/2078; B60R 2021/21512; B60R 2021/23146
See application file for complete search history.

(56) References Cited

U.S. PATENT DOCUMENTS

| 6,237,936 B1* | 5/2001 | Quade ................... B60R 21/207 280/728.2 |
| 8,814,200 B2* | 8/2014 | Hayashi ................. B60R 21/205 280/728.3 |
| 2013/0292929 A1* | 11/2013 | Fukawatase .......... B60R 21/207 280/730.2 |
| 2015/0360636 A1* | 12/2015 | Kaneko .................. B60N 2/449 280/730.2 |

FOREIGN PATENT DOCUMENTS

| JP | 11-091487 A | 4/1999 |
| JP | 2006-088850 A | 4/2006 |

* cited by examiner

*Primary Examiner* — Faye M Fleming
(74) *Attorney, Agent, or Firm* — Drinker Biddle & Reath LLP (57) ABSTRACT

A side airbag apparatus can suppress the deformation of the periphery of a storage case by reducing a gas pressure applied to the storage case for storing an airbag when the airbag expands. A side airbag apparatus installed between a vehicle body and a rear seat includes a base storage portion that stores an airbag and an inflator. The upper and lower ends of an opening formed on the front side of the vehicle body in the base storage portion are provided with gas pressure relief portions for relieving the gas pressure generated when the airbag expands and deploys toward the vehicle body front side. The gas pressure relief portions are formed to make their widths narrower sequentially from the upper and lower ends of the opening toward the outside of the opening.

7 Claims, 8 Drawing Sheets

FIG. 8 ental part for the vehicle body door and the rear seat are disposed slightly near both right and left ends of the opening, which makes it easier to further reduce the interference.

SIDE AIRBAG APPARATUS

CROSS-REFERENCE TO RELATED APPLICATIONS

This application is based upon and claims the benefit of priority from Japanese Patent Application No. 2014-144402, filed Jul. 14, 2014, the entire contents of which are incorporated herein by reference.

BACKGROUND

Disclosed herein is a side airbag apparatus that relieve impact from side bodies of motor vehicles, and more specifically, a side airbag apparatus installed between the vehicle body and the rear seat.

Conventionally, some side airbag apparatuses, which are installed between the vehicle body door and the rear seat in the width direction of the vehicle body, are known to include an inflator for injecting gas into an airbag, a box-shaped storage case for storing the airbag and the inflator, and a resin base cover for covering the storage case from the front side of the vehicle body (see, for example, Japanese Unexamined Patent Application Publications No. 2006-88850 A and No. H11-91487).

In a side airbag apparatus as described in JP-A-No. 2006-88850, when the airbag stored in the storage case is expanded by the inflator, the airbag breaks a thin part of the base cover located on the front side of the vehicle body, and then expands and deploys itself.

Specifically, in the event of an impact above a predetermined level from the side body of the vehicle, an impact sensor (not shown) senses the impact, and a power for ignition is supplied to the inflator, which then causes the airbag to expand and deploy beside an occupant.

In a side airbag apparatus for side collision as described in JP-A-No. H11-91487, an airbag module is mounted beside the rear seat and stores therein an airbag and an inflator. A cushion pad is installed at the front surface of the airbag module, and covered with a surface cover.

A stay cloth is attached to a part of the back side of the surface cover corresponding to the exterior side of the vehicle body such that the expanding directions of the airbag will be concentrated on a cleavage part of the surface cover.

With the structure described above, the airbag expands and deploys toward the cleavage part of the surface cover located on the front side of the vehicle body.

When the inflator operates to expand and deploy the airbag, a gas pressure from the inflator expanding the airbag is significantly applied to the storage case. This results in deformation of the storage case, which might adversely affect the expanding direction of the airbag.

However, the storage cases of the side airbag apparatus disclosed in JP-A-No. 2006-88850 and No. H11-91487 are not designed taking into consideration any means for reducing the gas pressure applied to the storage case when the airbag is expanded and deployed.

In particular, in the above related art, the storage case of the side airbag apparatus is made of metal in order to improve its strength. However, to achieve the weight reduction, the storage case material is changed to a resin. Even when the material for the storage case is changed to the resin, a technique is still required that can suppress the deformation of the storage case when the airbag expands and deploys itself.

In the side airbag apparatuses disclosed in JP-A-No. 2006-88850 and No. H11-91487, a stay cloth is attached to guide the expanding and deploying direction of the airbag. However, to make the expanding direction of the airbag more stable, it is still required to supplementarily guide the expanding direction of the airbag using an existing component.

SUMMARY

Various embodiments of the present invention have been made in view of the foregoing concerns, and it is an object of them to provide a side airbag apparatus that can suppress the deformation of the periphery of the storage case by reducing the gas pressure applied to the storage case storing therein the airbag and the inflator when the airbag expands and deploys.

It is another object to provide a side airbag apparatus that can stabilize the expanding and deploying direction of the airbag, using an existing component.

A side airbag apparatus according to various embodiments of the present invention solves the foregoing problems. The side airbag apparatus, installed between a vehicle body and a rear seat, includes an airbag capable of expanding, an inflator adapted to supply gas into the airbag, a base member mounted between a vehicle body door and the rear seat and having a base storage portion for storing the airbag in a folded state and the inflator, and a cover member that covers an opening formed in the base storage portion on a front side of the vehicle body. At least a part of an outer periphery of the opening is provided with a gas pressure relief portion for relieving a pressure of the gas when the airbag expands and deploys toward the front side of the vehicle body, and the gas pressure relief portion sequentially extends from the outer periphery toward an outside of the opening.

As mentioned above, the gas pressure relief portion is provided in at least the part of the outer periphery of the opening in the base storage portion. The gas pressure relief portion is designed to relieve the gas pressure when the airbag expands and deploys toward the vehicle body front side. Thus, the side airbag apparatus is provided that can reduce the gas pressure applied to the base storage portion to thereby suppress the deformation of the periphery of the base storage portion.

The gas pressure relief portion sequentially extends from the outer periphery of the opening in the base storage portion toward the outside of the opening. Such formation of the gas pressure relief portion can expand the opening on the vehicle body front side of the base storage portion to assist in guiding the expanding and deploying direction of the airbag toward the vehicle body front side.

The gas pressure relief portion is preferably formed with a concave shape in at least one of upper and lower ends of the opening in such a manner as to make its width narrower toward the outside of the opening.

The above-mentioned structure can guide and stabilize the expanding and deploying direction of the airbag toward the vehicle body front side.

The gas pressure relief portion is provided in at least one of the upper and lower ends of the opening, which can easily suppress interference with other components, thereby improving the flexibility in arrangement of the components, as compared to the case of providing gas pressure relief portions on both right and left ends of the opening. In particular, an attachment part for the vehicle body door and another attachment part for the rear seat are disposed slightly near both right and left ends of the opening, which makes it easier to further reduce the interference.

Here, preferably, the gas pressure relief portion has a substantially triangular cross-sectional shape and is provided at each of upper and lower ends of the opening.

The above-mentioned structure can guide and stabilize the expanding and deploying direction of the airbag toward the vehicle body front side.

Further, the gas pressure relief portion is preferably formed to become shallower toward the outside of the opening.

The above-mentioned structure can guide and stabilize the expanding and deploying direction of the airbag toward the vehicle body front side.

In this case, preferably, the gas pressure relief portion is provided at a center in a width direction of each of the upper and lower ends of the opening, and a pair of stepped portions is formed on both right and left sides of a part sequentially extended from the gas pressure relief portion at each of the upper and lower ends of the opening.

With the above-mentioned structure, even when the gas pressure relief portions are formed at the respective upper and lower ends of the base storage portion, the airbag is stored in the base storage portion while being supported by a pair of stepped portions positioned at the respective upper and lower ends of the base storage portion, which facilitates positioning a stored position for the airbag in the upward and downward direction. As a result, the expanding and deploying direction of the airbag is stabilized.

A sidewall portion of the gas pressure relief portion preferably forms an inner wall surface substantially perpendicular to an opening surface of the gas pressure relief portion.

With the above-mentioned structure, the expanding and deploying direction of the airbag can be guided toward the vehicle body front side and thus be stabilized more.

Here, the side airbag apparatus further includes a stay cloth having one end thereof attached to the cover member and the other end thereof retained by a stay cloth retaining portion provided at the base storage portion, the stay cloth being adapted to guide an expanding and deploying direction of the airbag. Preferably, the respective gas pressure relief portions are disposed in each of above and below the airbag, and the stay cloth retaining portions are disposed outside the airbag in right and left width direction thereof.

With the above-mentioned structure, in order to stabilize the expanding and deploying direction of the airbag toward the vehicle body front side, the expanding and deploying of the airbag expanding in the right and left width direction can be restricted by the stay cloth, while the expanding and deploying of the airbag expanding in the upward and downward direction can also be restricted by the pair of the gas pressure relief portions.

According to a first embodiment of the invention, since the gas pressure relief portion is formed, the side airbag apparatus can reduce a gas pressure applied to the base storage portion, thereby suppressing the deformation of the periphery of the base storage portion.

The formation of the gas pressure relief portion can expand the opening located at the vehicle body front side of the base storage portion, thereby assisting in guiding the expanding direction of the airbag toward the vehicle body front side.

According to second, third, and fourth embodiments of the invention, the expanding direction of the airbag can be guided toward the vehicle body front side and thus stabilized.

Further, this arrangement can easily suppress the interference between the gas pressure relief portion and other components, thereby improving the flexibility in arrangement of the gas pressure relief portion. In particular, an attachment part for the vehicle body door and another attachment part for the rear seat are disposed slightly near both right and left ends of the opening, making it easier to further reduce the interference.

According to a fifth embodiment of the invention, the storage position of the airbag can be easily positioned in the upward and downward direction.

According to a sixth embodiment of the invention, the expanding and deploying direction of the airbag can be guided toward the vehicle body front side and thus stabilized.

According to a seventh embodiment of the invention, in order to stabilize the expanding and deploying direction of the airbag toward the vehicle body front side, the expanding and deploying of the airbag expanding in the right and left width direction can be restricted by the stay cloth, while the expanding and deploying of the airbag expanding in the upward and downward direction can also be restricted by the pair of the gas pressure relief portions.

BRIEF DESCRIPTION OF THE DRAWINGS

Various embodiments of the invention are illustrated in the following drawings.

DETAILED DESCRIPTION

In the following, a side airbag apparatus according to one embodiment of the invention will be described with reference to FIGS. 1 to 8.

This embodiment of the invention is directed to the side airbag apparatus installed between a vehicle body door and a rear seat of the vehicle. The side airbag apparatus includes a base storage portion that stores an airbag and an inflator. An opening is formed on the front side of the vehicle body in the base storage portion. The upper and lower ends of the opening are provided with concave gas pressure relief portions for relieving the pressure of gas when the airbag expands and deploys toward the front side of the vehicle body. The gas pressure relief portions are formed to make their widths narrower sequentially from the upper and lower ends of the opening toward the outside of the opening.

Figure 1:
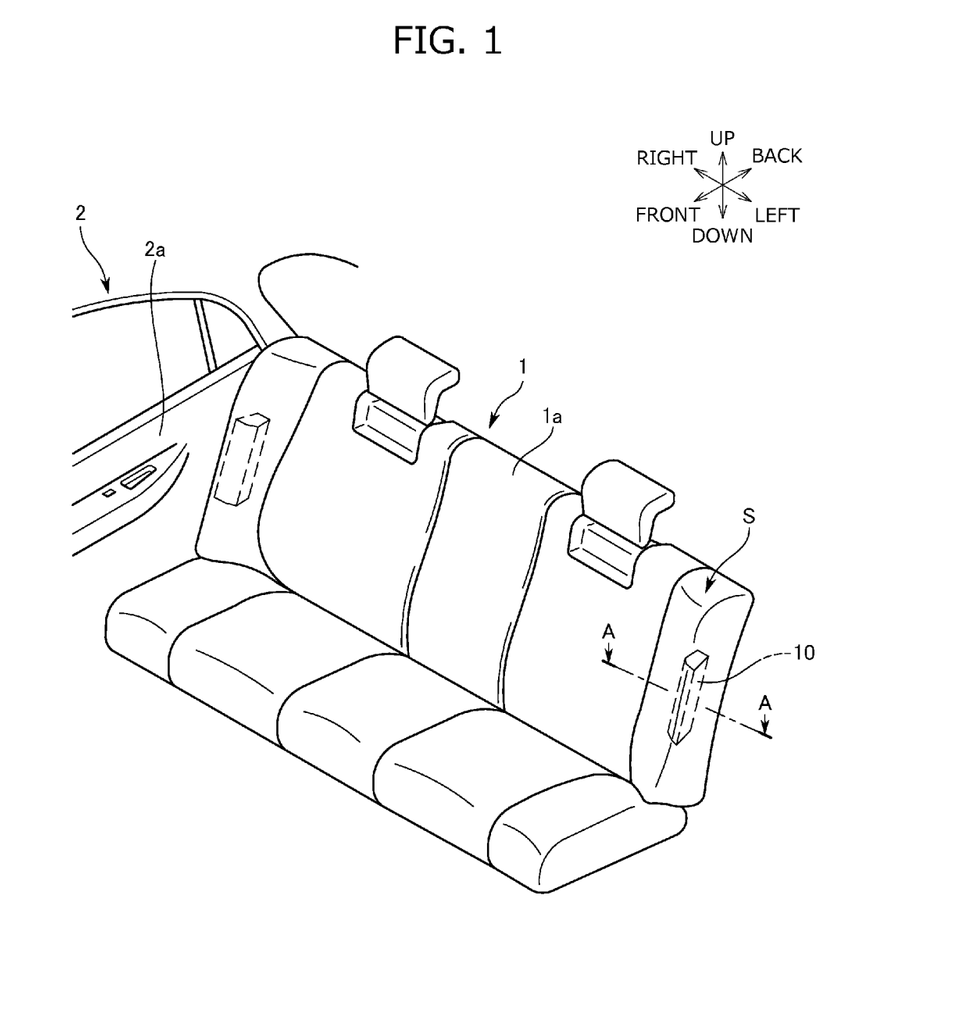
FIG. 1 is an explanatory perspective view diagram showing the arrangement of a side airbag apparatus according to one embodiment of the invention.

A side airbag apparatus S of this embodiment is to relieve the impact applied from the vehicle side body on an occupant. As shown in FIG. 1, the side airbag apparatus is disposed between a seat back 1a serving as the backrest of a rear seat 1 and a vehicle body door 2a of a vehicle body 2 in the vehicle body width direction.

Note that the side airbag apparatus S are installed one by one on the outer right and left sides of the rear seats 1 in the vehicle body width direction.

Figure 2:
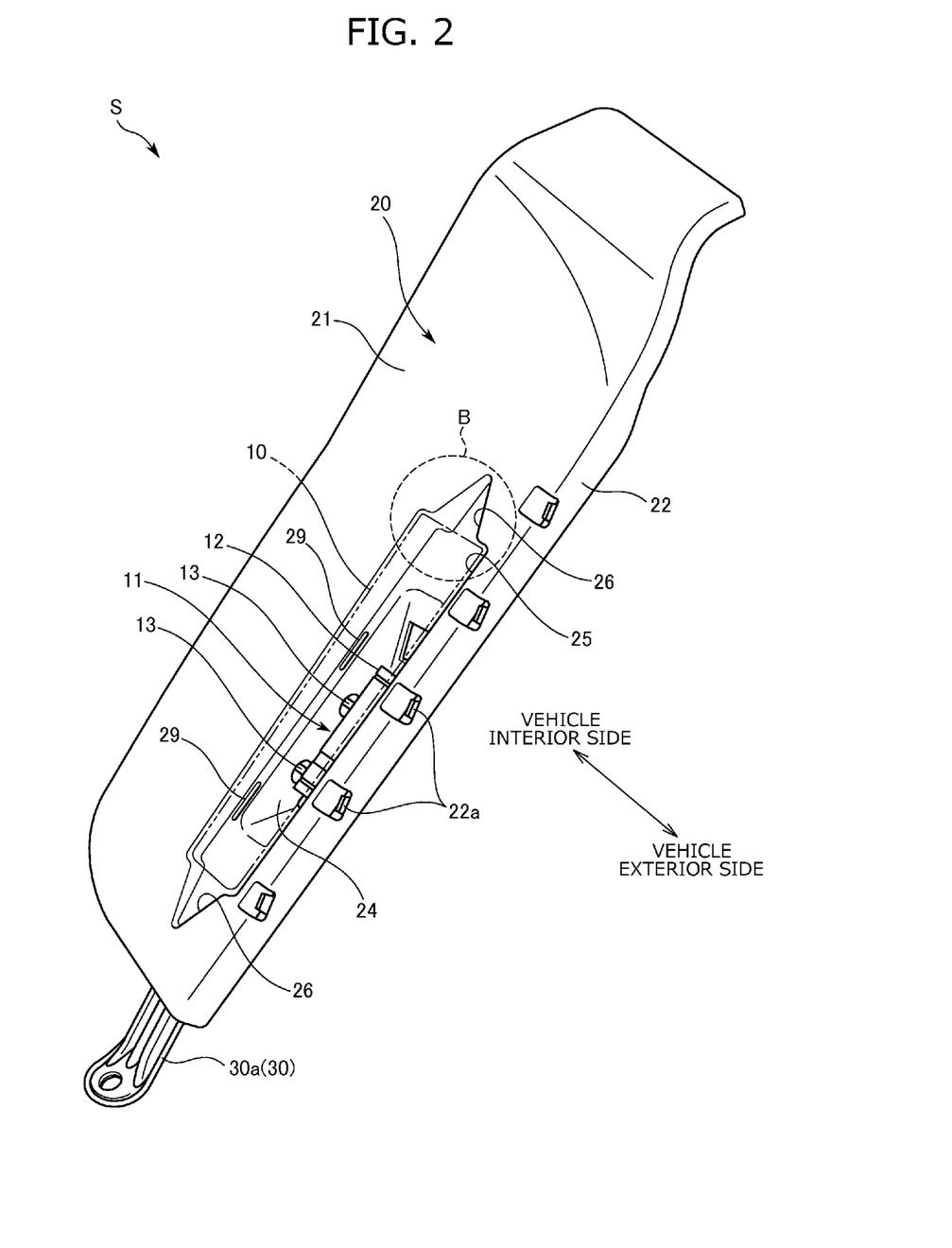
FIG. 2 is a perspective view of a base member of the side airbag apparatus as viewed from its front side.
Figure 4:
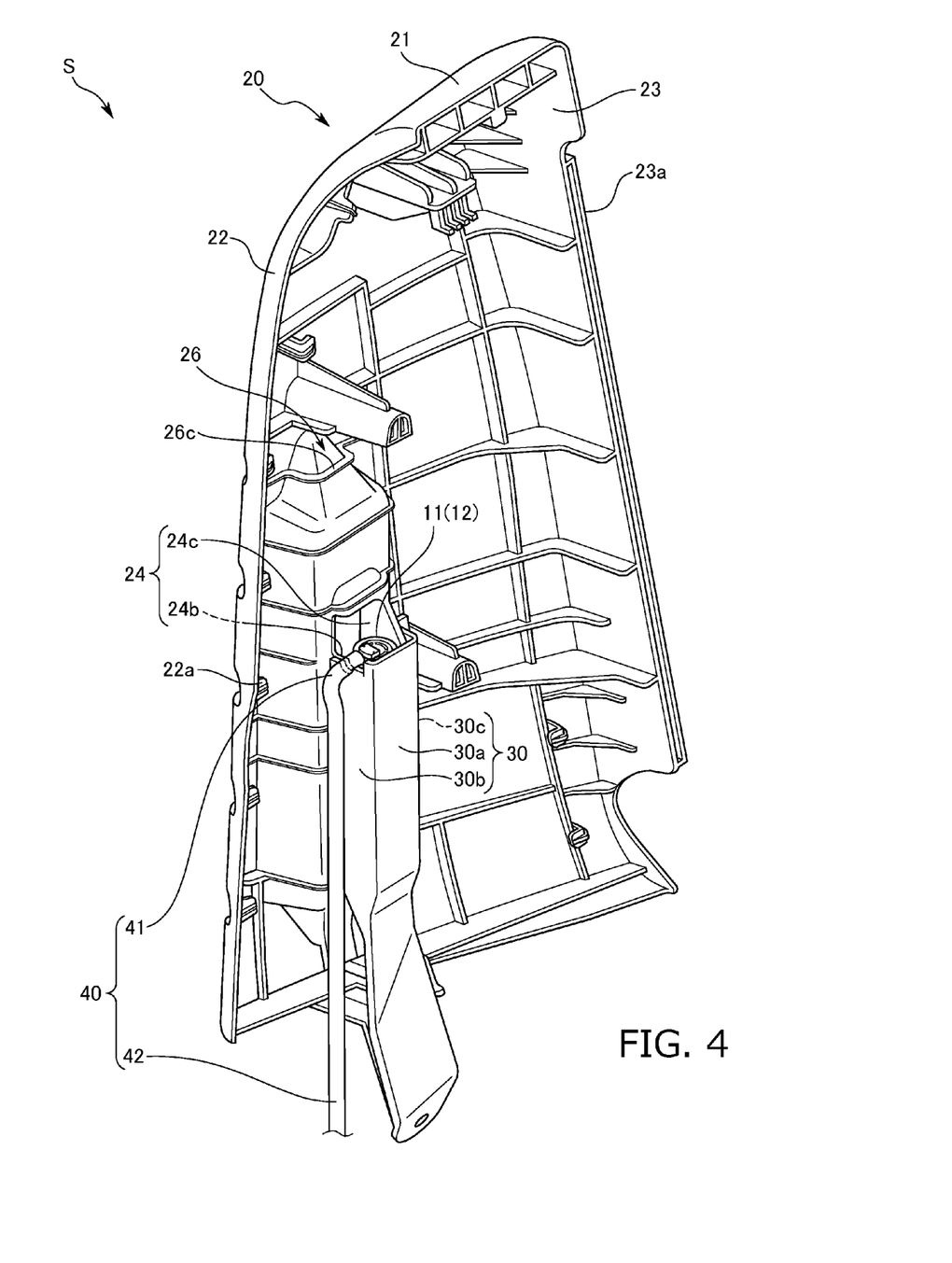
FIG. 4 is a perspective view of a base member as viewed from its back side.

The side airbag apparatus S, as shown in FIG. 2, mainly includes an airbag 10 capable of expanding, an inflator 11 for supplying gas into the airbag 10, a base member 20 for storing therein the airbag 10 in a folded state and the inflator 11. The side airbag apparatus S, as shown in FIG. 4, also includes a retainer 30 for holding the airbag 10 and the inflator 11 stored in the base member 20, from the rear side of the vehicle body, and a harness 40 connected to the inflator 11 and adapted to supply a power for ignition to the inflator 11.

Figure 7:
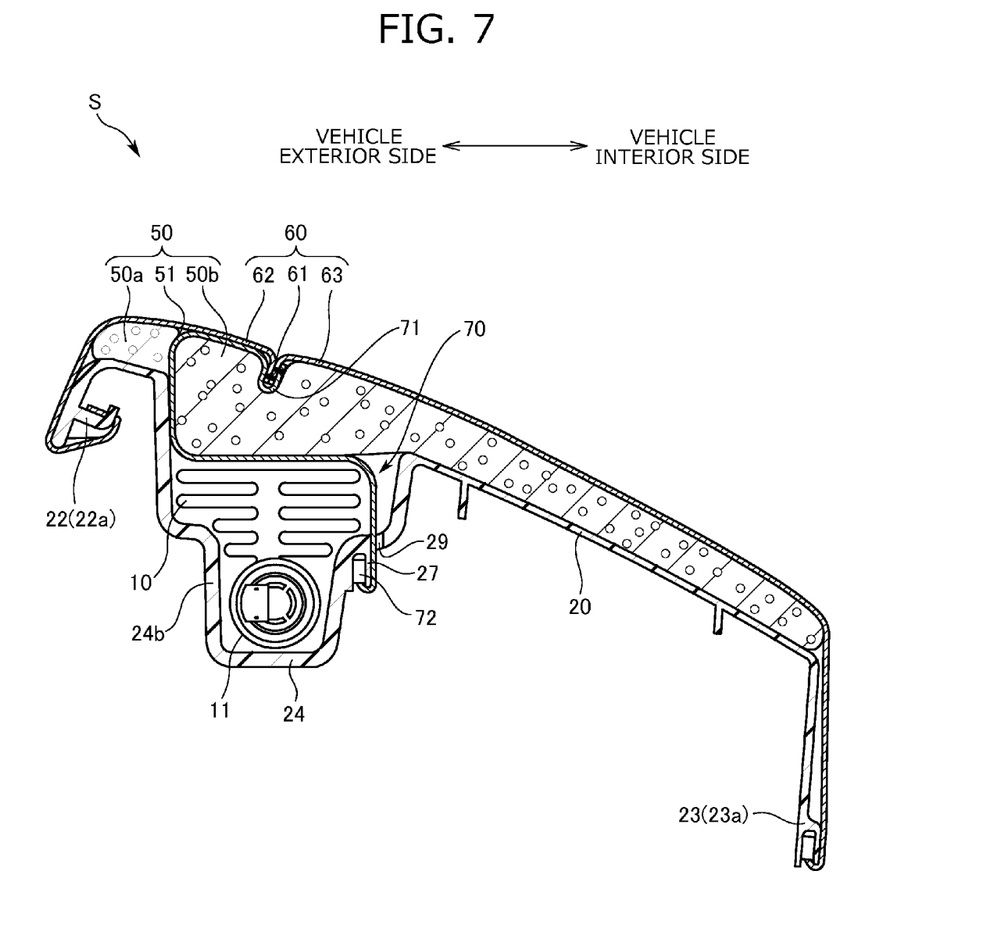
FIG. 7 is a sectional view taken along the line A-A of FIG. 1, showing a state of an airbag stored.

Further, the side airbag apparatus S, as shown in FIG. 7, includes a pad member 50 mounted in the position of the base member 20 on the front side of the vehicle body, a skin material 60 covering the base member 20 and the pad member 50 from the front side of the vehicle body, and a stay cloth 70 having one end thereof sewed on the skin material 60 and the other end thereof retained by a stay cloth retaining portion 27 of the base member 20, the stay cloth 70 being adapted to guide the expanding direction of the airbag 10.

The skin material 60 corresponds to a cover member in the embodiments.

Figure 8:
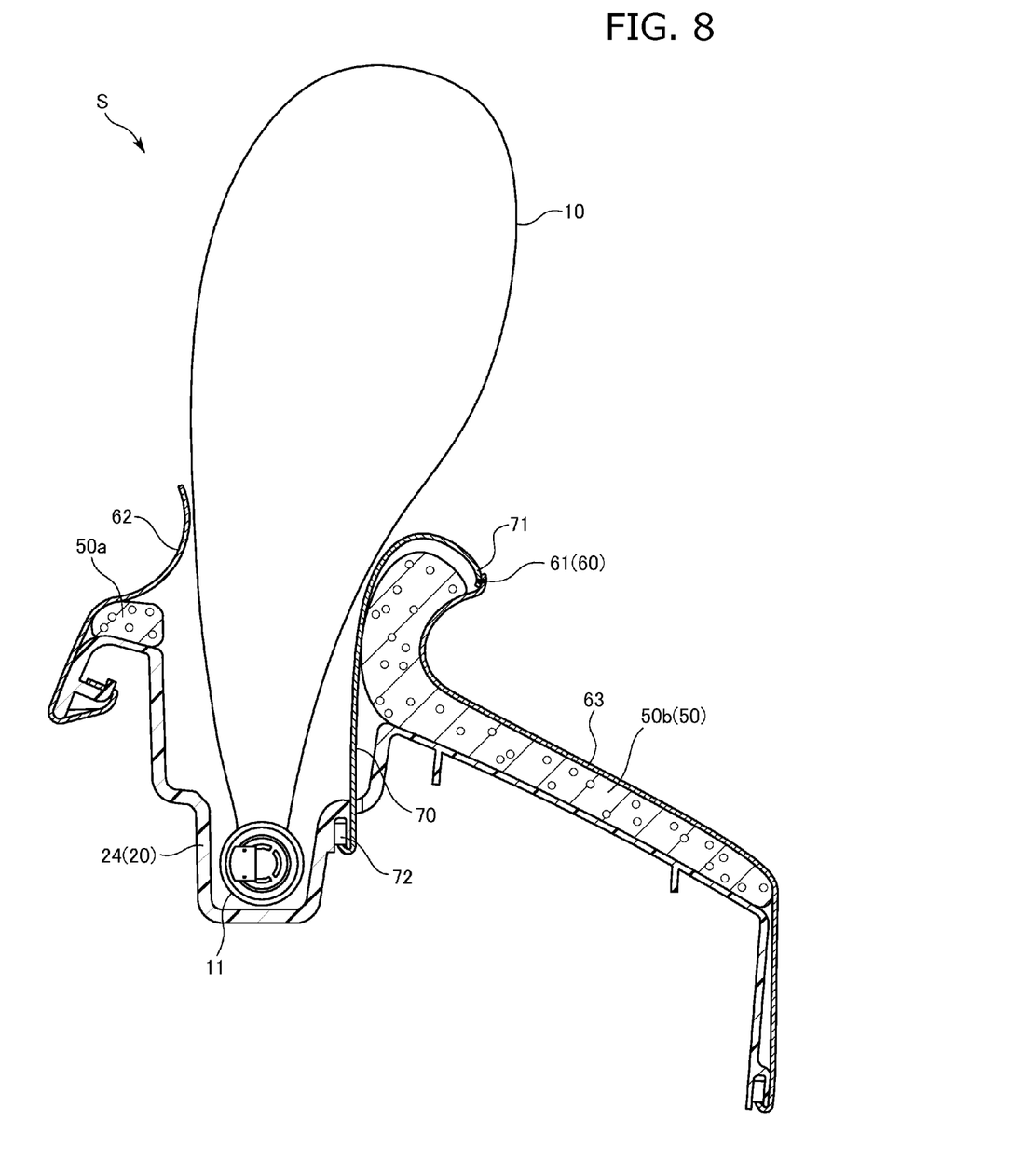
FIG. 8 is a sectional view taken along the line A-A of FIG. 1, showing a state of an airbag expanded.

The airbag 10 is a bag-shaped member that expands and deploys in a balloon manner from the folded state shown in FIG. 7 to the front side of the vehicle body as shown in FIG. 8 in the side impact from the side body of the vehicle.

Specifically, the gas is supplied from the inflator 11 coupled to the airbag 10 and serving as a gas generator into the airbag 10, thereby allowing the airbag 10 to expand.

As shown in FIG. 2, the inflator 11 is comprised of a gas generator having a substantially longitudinal, cylindrical shape. The inflator 11 is disposed to have its longitudinal shape oriented in the vertical direction, or the upward and downward direction.

The inflator 11 includes an airbag coupling portion (not shown) protruding forward of the vehicle body rather than its outer surface and coupled to the inside of the airbag 10, a harness connecting portion 12 formed at an upper end of the inflator and connected to the harness 40, and assembly shafts 13 protruding on a side of the side body of the vehicle rather than its outer surface and assembled to the base member 20 and the retainer 30.

With the structure described above, when an impact is applied from the side body of the vehicle, the power for ignition is supplied to the inflator 11 from a vehicle battery (not shown) disposed at the vehicle body on the side of an occupant's feet via the harness 40, whereby the airbag 10 expands and deploys beside the occupant.

The airbag 10 and the inflator 11 are stored in a base storage portion 24 provided in the base member 20 to be described later.

The base member 20 is composed of a resin frame serving as a substrate for the side airbag apparatus S and designed to store therein the airbag 10 and the inflator 11 as shown in FIG. 2.

The base member 20 has a substantially reversed L shape as viewed from the side body of the vehicle. The base member 20 is disposed between the seat back 1a and the vehicle body door 2a in the vehicle body width direction and has its respective upper and lower ends detachably installed on a vehicle body member (not shown).

Referring to FIG. 2 or 4, the base member 20 mainly includes a base main body 21 disposed between the rear seat 1 and the vehicle body 2, and a base outer wall 22 and a base inner wall 23 extending sequentially from both ends in the vehicle body width direction of the base main body 21 toward the rear side of the vehicle body.

The base main body 21 is made up of a plate member having a substantially reversed L shape. The base main body 21 is integrally formed as a component on a slightly outer side of the vehicle body rather than its center in the vehicle body width direction. The base main body 21 includes the base storage portion 24 recessed toward the rear side of the vehicle body, and a pair of gas pressure relief portions 26 provided at the outer periphery of an opening 25 formed in the base storage portion 24.

The base outer wall 22 is disposed facing the vehicle body door 2a. As shown in FIG. 2, the base outer wall 22 has on its extending end portion, a plurality of retaining claws 22a that are arranged spaced apart in the upward and downward direction to retain the one end portion of the skin material 60.

The base inner wall 23 is disposed facing the seat back 1a. As shown in FIG. 4, the base inner wall 23 has on its extending end portion, a tucking groove 23a that is formed longitudinally in the upward and downward direction and into which the other end of the skin material 60 is fitted.

The base storage portion 24, as shown in FIG. 2, is formed of a box that extends longitudinally in the upward and downward direction and has the opening 25 at the front side of the vehicle body. The base storage portion 24 has an internal space having a substantially convex shape. The airbag 10 and the inflator 11 are detachably stored in the internal space of the base storage portion 24.

Figure 5:
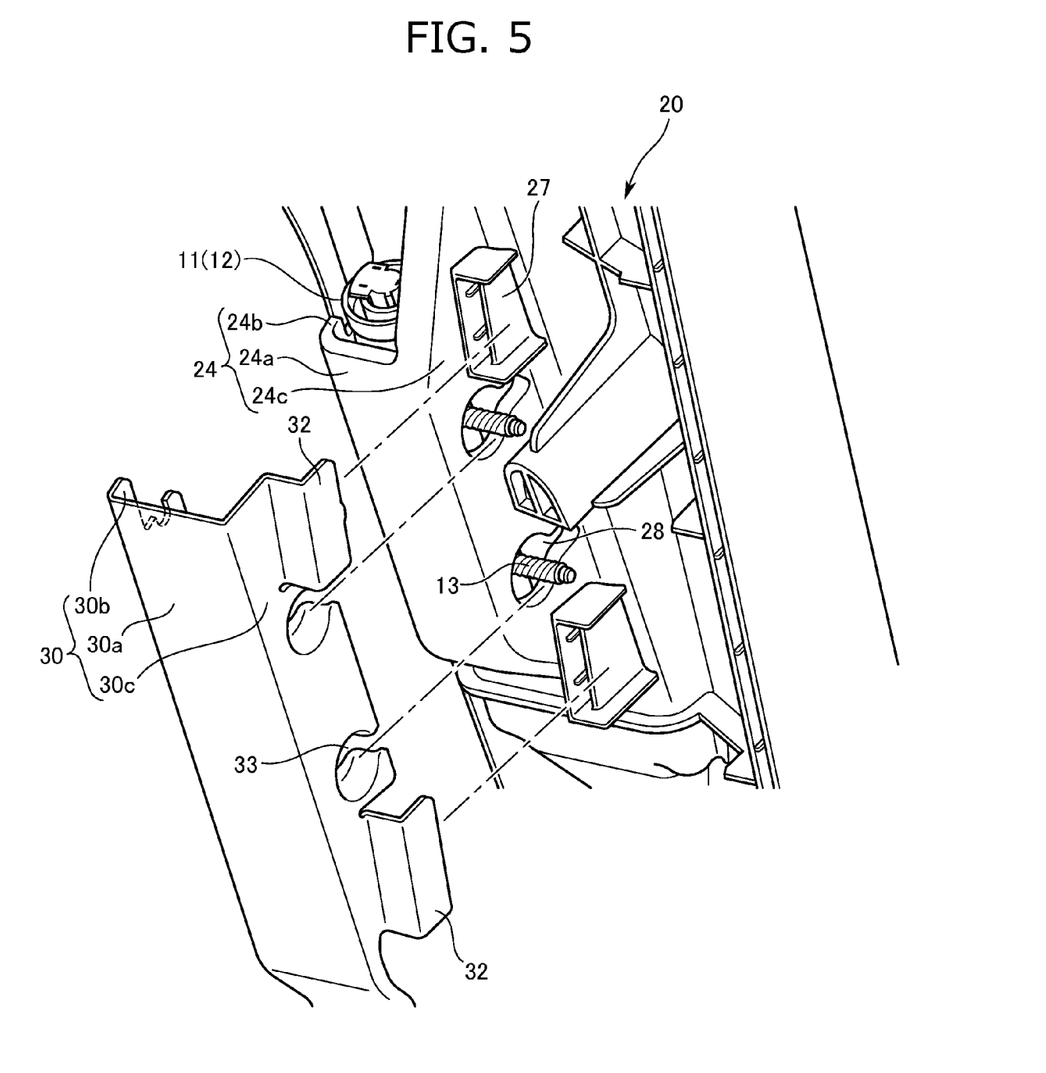
FIG. 5 is an exploded perspective view for explaining an assembly structure of the base member and a retainer.

As shown in FIG. 5, the base storage portion 24 includes a rear wall portion 24a disposed on the rear side of the vehicle body of the airbag 10 and the inflator 11, an outer sidewall portion 24b disposed on the vehicle exterior side in the vehicle body width direction, and an inner sidewall portion 24c disposed on the vehicle interior side. The outer sidewall portion 24b and the inner sidewall portion 24c respectively extend sequentially from both ends in the vehicle body width direction of the rear wall portion 24a toward the front side of the vehicle body.

An opening is formed at an upper part of the base storage portion 24 to expose the upper end of the inflator 11.

Figure 3:
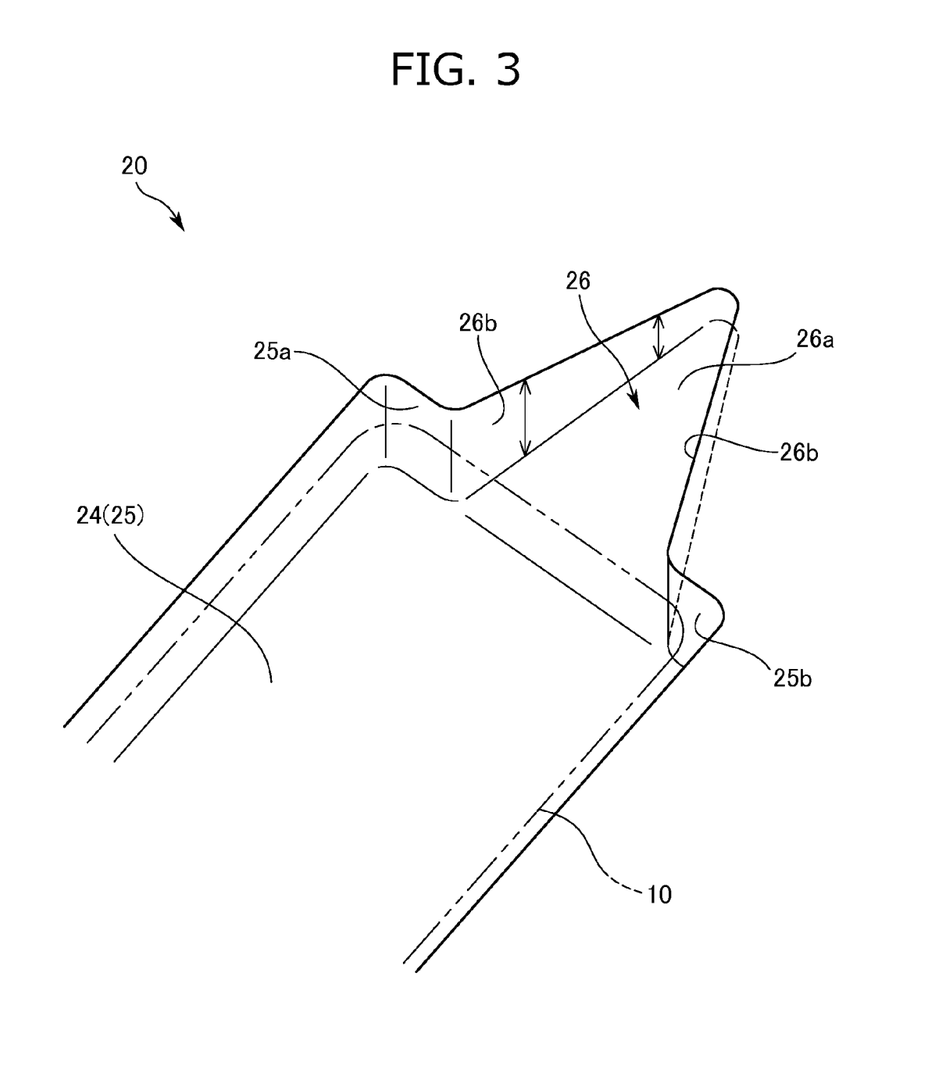
FIG. 3 is an enlarged perspective view of a main portion of FIG. 2, showing a perspective view of the periphery of a gas pressure relief portion.

The gas pressure relief portion 26 is a concave portion having a substantially triangular shape to relieve the pressure of gas supplied from the inflator 11 when the airbag 10 expands and deploys. As shown in FIG. 2 or 3, the gas pressure relief portions 26 are respectively formed at the upper and lower ends of the opening 25 in the base storage portion 24.

Specifically, the gas pressure relief portions 26 are formed to respectively extend sequentially from the upper and lower ends of the opening 25 to make their widths narrower toward the outer side of the opening 25.

Further, the gas pressure relief portion 26 is formed to be shallower sequentially toward the outside of the opening 25. In other words, a bottom wall 26a of the gas pressure relief portion 26 is shaped to extend while being inclined from the side of the base storage portion 24 toward the exterior side to gradually approach the opening of the gas pressure relief portion 26.

The gas pressure relief portions 26 are provided in the center in the width direction at the respective upper and lower ends of the opening 25. At each of the upper and lower ends of the opening 25, a pair of stepped portions 25a and 25*b* is formed on both right and left sides of the part sequentially extending from the gas pressure relief portion 26.

The paired stepped portions 25*a* and 25*b* serve as positioning parts of the airbag 10 in the upward and downward direction by being abutted against the upper end part and lower end part of the airbag 10, respectively, when the airbag 10 is stored in the base storage portion 24.

A pair of sidewall portions 26*b* of the gas pressure relief portion 26 is formed along the front to back direction of the vehicle body and provided to form an inner wall surface substantially perpendicular to an opening surface of the gas pressure relief portion 26.

As shown in FIG. 4, a reinforcing rib 26*c* is formed at the rear part of the gas pressure relief portion 26 to protrude toward the rear side of the vehicle body.

The reinforcing rib 26*c* is formed to extend in the vehicle body width direction sequentially to couple the base main body 21 to the gas pressure relief portion 26. Thus, the rigidity of the periphery of the gas pressure relief portion 26 is improved.

As shown in FIG. 4, the outer sidewall portion 24*b* of the base storage portion 24 is provided with a cutout portion capable of supporting a part of the harness 40 at a part of the inflator 11 facing the harness connecting portion 12.

As shown in FIG. 5, the inner sidewall portion 24*c* is provided with the two stay cloth retaining portions 27 and two base holes 28. These two stay cloth retaining portions 27 are overhung with a predetermined spacing therebetween in the upward and downward direction and capable of retaining the other end of the stay cloth 70. These two base holes 28 are formed with a predetermined spacing therebetween in the upward and downward direction, are disposed in between the two stay cloth retaining portions 27, and allow for insertion of assembly shafts 13 of the inflator 11.

The retainer 30 is comprised of a metal holding member that holds the airbag 10 and the inflator 11 from the rear side of the vehicle body. As shown in FIG. 4, the retainer 30 is installed on the base storage portion 24 from the rear side of the vehicle body.

The retainer 30 includes a rear wall portion 30*a* disposed on the vehicle body rear side of the base storage portion 24 and having a substantially U shape, and an outer sidewall portion 30*b* and an inner sidewall portion 30*c* extending sequentially from both ends of the rear wall portion 30*a* in the vehicle body width direction toward the front side of the vehicle body.

As shown in FIG. 5, the inner sidewall portion 30*c* is provided with two stay cloth holding portions 32 and two retainer holes 33. These two stay cloth holding portions 32 are overhung with a predetermined spacing therebetween in the upward and downward direction and configured to hold the stay cloth retaining portion 27 retaining the stay cloth 70. These two retainer holes 33 are formed with a predetermined spacing therebetween in the upward and downward direction, are disposed in between the two stay cloth holding portions 32, and allow for insertion of assembly shafts 13 of the inflator 11.

The retainer hole 33 and the base hole 28 are arranged to communicate with each other while the retainer 30 and the base storage portion 24 are assembled together.

Figure 6:
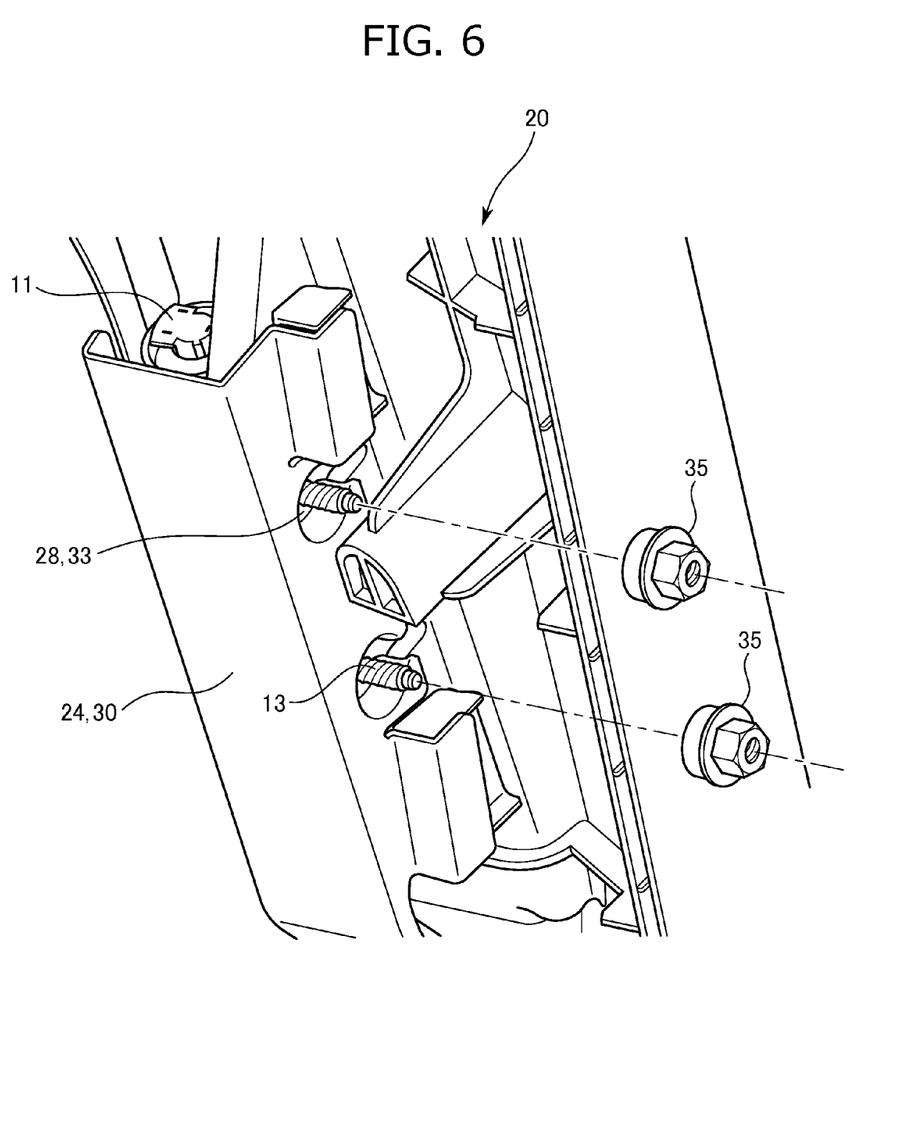
FIG. 6 is an exploded perspective view for explaining an assembly structure of an assembly shaft of an inflator and an assembly member.

With the above-mentioned structure, as shown in FIG. 6, the assembly shafts 13 of the inflator 11 are inserted into the base holes 28 and the retainer holes 33 to be assembled with the inserted ends of the shafts fitted into assembly members 35 corresponding to assembly nuts, whereby the inflator 11, the base member 20, and the retainer 30 are respectively fixed.

The harness 40 is a wire harness that supplies the electric power for ignition to the inflator 11. The harness 40 is constituted by collecting a plurality of electric wires by a corrugate tube and attaching a coupler to the tip ends of the wires.

In the harness 40, as shown in FIG. 4, an upper end 41 is connected to the harness connecting portion 12 located at the upper end of the inflator 11, and a lower end 42 is connected to a vehicle battery disposed on the side of the occupant's feet at the vehicle body. The harness 40 extends to be longitudinal in the upward and downward direction.

As shown in FIG. 7, the pad member 50 is made of a cushion material placed between the base member 20 and the skin material 60, and installed across the entire surface on the vehicle body front side of the base member 20. The pad member 50 is fixed to a pad attachment portion (not shown) provided in a predetermined position of the base member 20, whereby the pad member 50 is coupled to the base member 20.

The pad member 50 has a pad opening 51 penetrating in the front to back direction of the vehicle body and formed at a part of the pad member opposed to the base storage portion 24, specifically, at a part of the pad member on the side opposed to the outer sidewall portion 24*b* in the base storage portion 24.

The pad member 50 includes an outer pad member 50*a* disposed on the vehicle exterior side of the pad opening 51, and an inner pad member 50*b* disposed on the vehicle interior side of the pad opening 51, which are integrated together.

The pad opening 51 is an opening that is longitudinal in the upward and downward direction, and the stay cloth 70 is inserted into and passes through the pad opening 51 to extend from the side of the skin material 60 toward the side of the base member 20.

The pad opening 51 and the stay cloth retaining portion 27 are positioned opposite to each other in the vehicle body width direction with respect to the airbag 10.

With the above-mentioned structure, as shown in FIG. 8, when the airbag 10 expands and deploys, the pad member 50 is divided into the outer pad member 50*a* and the inner pad member 50*b* to be deployed via the pad opening 51 as a branch point in the vehicle body width direction.

At this time, the expanding direction of the airbag 10 is guided by the stay cloth 70 so that the airbag 10 can be deployed without scattering a part of the pad member 50 located at the front of the vehicle body in the base storage portion 24.

As shown in FIG. 7, the skin material 60 corresponds to a cover member covering the base member 20 and the pad member 50 from the vehicle body front side. A skin cleavage portion 61 is formed substantially at the center in the vehicle body width direction of the skin material 60, and in the position corresponding to the center of the base storage portion 24. The skin cleavage portion 61 is adapted to cleave the skin material when the airbag 10 expands and deploys.

The skin material 60 mainly includes an outer skin material 62 disposed on the vehicle exterior side of the skin cleavage portion 61, and an inner skin material 63 disposed on the vehicle interior side of the skin cleavage portion 61. One ends of the outer skin material 62 and the inner skin material 63 are coupled together in the position of the skin cleavage portion 61.

The other end on the vehicle exterior side of the outer skin material 62 is retained by the retaining claw 22a of the base outer wall 22 in the upward and downward direction, while the other end on the vehicle interior side of the inner skin material 63 is tucked into a tucking groove 23a at the base inner wall 23.

Specifically, the other end of the outer skin material 62 has a retaining hole extending in the upward and downward direction and designed to retain the outer skin material 62 therein by the retaining claw 22a. The other end of the inner skin material 63 has a resin trim cord sewed for fitting the inner skin material 63 into the tucking groove 23a.

With the above-mentioned structure, as shown in FIG. 8, when the airbag 10 expands and deploys, the skin material 60 is divided into the outer skin material 62 and the inner skin material 63 to be deployed via the skin cleavage portion 61 as a branch portion.

The skin cleavage portion 61 is disposed to be superimposed over the airbag 10 in the vehicle body width direction.

The stay cloth 70 is comprised of a cloth member that guides the expanding and deploying direction of the airbag 10 toward the vehicle front side.

As shown in FIG. 7, the stay cloth 70 has one end 71 attached to the skin cleavage portion 61 of the skin material 60, and extends to cover the pad member 50 sequentially from the one end 71, while having the other end 72 retained by the stay cloth retaining portion 27 provided in the base storage portion 24.

Specifically, the stay cloth 70 extends sequentially from the one end 71 sewed at the skin cleavage portion 61 on the inner skin material 63 side toward the vehicle exterior side along the front surface of the inner pad member 50b to reach the position opposed to the pad opening 51.

The stay cloth 70 sequentially extends along the vehicle exterior side surface and back side surface of the inner pad member 50b through the pad opening 51 to reach a stay cloth insertion hole 29 formed at the inner sidewall portion 24c of the base storage portion 24.

The stay cloth 70 sequentially extends to the stay cloth retaining portion 27 via the stay cloth insertion hole 29 to be retained by the stay cloth retaining portion 27.

At this time, the other end 72 of the stay cloth 70 has a resin trim cord sewed for retaining the stay cloth by the stay cloth retaining portion 27.

With the above structure, as shown in FIG. 8, when the airbag 10 expands and deploys, the stay cloth 70 guides the expanding direction of the airbag 10 toward the skin cleavage portion 61 of the skin material 60.

One end 71 side of the stay cloth 70 is deployed toward the front side in the front to back direction of the vehicle body, together with the inner pad member 50b and the inner skin material 63, as well as toward the vehicle interior side in the vehicle body width direction.

Other Embodiments

Although in the above-mentioned embodiments, as shown in FIG. 2, the gas pressure relief portions 26 are provided at the upper and lower ends of the opening 25 in the base storage portion 24, the invention is not limited thereto. Alternatively, the gas pressure relief portion 26 may be provided, for example, at either the upper end or the lower end of the opening 25, or may be provided at both right and left ends of the opening 25.

Although the gas pressure relief portion 26 is formed as a concave portion having a substantially triangle cross-sectional shape, its shape is not limited thereto. The gas pressure relief portion 26 may be formed as a concave portion or a hole having a substantially semicircular cross-sectional shape, a substantially trapezoidal cross-sectional shape, or the like.

Although in the above-mentioned embodiments, as shown in FIG. 7, the stay cloth retaining portion 27 is formed at the inner sidewall portion 24c of the base storage portion 24, the invention is not limited thereto. In the base storage portion 24, the stay cloth retaining portion 27 may be formed at the outer sidewall portion 24b or rear wall portion 24a.

Note that the stay cloth retaining portion 27 is preferably formed on the vehicle interior side in the vehicle body width direction rather than the airbag 10 and the inflator 11 in the base storage portion 24.

In this way, the stay cloth 70 can more stably expand and deploy the airbag 10 toward the vehicle body front side.

The reason for this is that the outer sidewall portion 24b side in the vehicle body width direction of the base storage portion 24 for storing the airbag 10 is supported by the vehicle body door 2a having relatively high rigidity, while the inner sidewall portion 24c side in the vehicle body width direction thereof is supported by the rear seat 1 having relatively high elasticity. Then, the expanding and deploying direction of the airbag 10 tends to be drawn toward the rear seat 1 having the higher elasticity in the vehicle body width direction.

The stay cloth retaining portion 27 is provided on the side of the inner sidewall portion 24c to preferentially guide the side of the inner sidewall portion 24c by the stay cloth 70, thereby stabilizing the expanding and deploying direction of the airbag 10.

Although the above-mentioned embodiments have described the side airbag apparatus S for use at a rear seat of a motor vehicle, the invention is not limited thereto. The side airbag apparatus S may be applied to front seats of motor vehicles, seats for vehicles, such as a train, a bus, etc., seats for transportation, such as an airplane, a ship, etc.

The present embodiments have mainly described the side airbag apparatus S according to the invention.

However, the above embodiments are only illustrative by way of example for better understanding of the invention, and are not intended to restrict the invention. It will be understood that various modifications and changes can be made and equivalents may be substituted for the embodiments disclosed without departing from the scope of the invention.

In particular, the embodiments have described the arrangements and structures of the base member 20, the base storage portion 24, the gas pressure relief portion 26, and the stay cloth retaining portion 27, which are components of the side airbag apparatus S. However, these descriptions are only illustrative by way of example and are not intended to restrict the invention.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps.

Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

TABLE OF REFERENCE NUMERALS

S side airbag apparatus
1 rear seat
1a seat back
2 vehicle body
2a vehicle body door
10 airbag
11 inflator
12 harness connecting portion
13 assembly shaft
20 base member
21 base main body
22 base outer wall
22a retaining claw
23 base inner wall
23a tucking groove
24 base storage portion
24a rear wall portion
24b outer sidewall portion
24c inner sidewall portion
25 opening
25a, stepped portion
25b
26 gas pressure relief portion
26a bottom wall
26b side wall portion
26c reinforcing rib
27 stay cloth retaining portion
28 base hole
29 stay cloth insertion hole
30 retainer
30a rear wall portion
30b outer sidewall portion
30c inner sidewall portion
32 stay cloth holding portion
33 retainer hole
35 assembly member
40 harness
41 upper end
42 lower end
50 pad member
50a outer pad member
50b inner pad member
51 pad opening
60 skin material
61 skin cleavage portion
62 outer skin material
63 inner skin material
70 stay cloth
71 one end
72 other end

What is claimed is:

1. A side airbag apparatus installed between a vehicle body and a rear seat, the side airbag apparatus comprising:
an expandable airbag;
an inflator adapted to supply gas into the airbag;
a base member mounted between a vehicle body door and the rear seat, the base member having a base storage portion for storing therein the airbag in a folded state and the inflator, the base storage portion having an opening formed on a front side of the base storage portion in a seat body front to rear direction; and
a cover member that covers the opening;
wherein:
at least a part of an outer periphery of the opening is provided with a gas pressure relief portion for relieving a pressure of the gas when the airbag expands and deploys toward the front side of the vehicle body, and the gas pressure relief portion sequentially extends from the outer periphery of the opening toward an outside of the opening.

2. The side airbag apparatus according to claim 1, wherein the gas pressure relief portion is formed with a concave shape in at least one of upper and lower ends of the opening in such a manner as to make a width thereof narrower toward the outside of the opening.

3. The side airbag apparatus according to claim 2, wherein the gas pressure relief portion has a substantially triangular cross-sectional shape and is provided at each of upper and lower ends of the opening.

4. The side airbag apparatus according to claim 1, wherein the gas pressure relief portion is formed to become shallower toward the outside of the opening.

5. The side airbag apparatus according to claim 1, wherein:
   the gas pressure relief portion is provided at a center in a width direction of each of the upper and lower ends of the opening, and
   a pair of stepped portions is formed on both right and left sides of a part sequentially extended from the gas pressure relief portion at each of the upper and lower ends of the opening.

6. The side airbag apparatus according to claim 1, wherein a sidewall portion of the gas pressure relief portion forms an inner wall surface substantially perpendicular to an opening surface of the gas pressure relief portion.

7. The side airbag apparatus according to claim 1, further comprising:
   a stay cloth having one end thereof attached to the cover member and the other end thereof retained by a stay cloth retaining portion provided at the base storage portion, the stay cloth being adapted to guide an expanding and deploying direction of the airbag; wherein:
   the gas pressure relief portions are disposed in each of above and below the airbag, and
   the stay cloth retaining portions are disposed outside the airbag in a right and left width direction thereof.

* * * * *